Nov. 27, 1962 A. G. SCHRAMM 3,065,871
SELF ELEVATING FORK LIFT TRUCK TRAILER
Filed Nov. 14, 1960 2 Sheets-Sheet 1

INVENTOR.
Arthur G. Schramm
BY Scott L. Norvied
atty

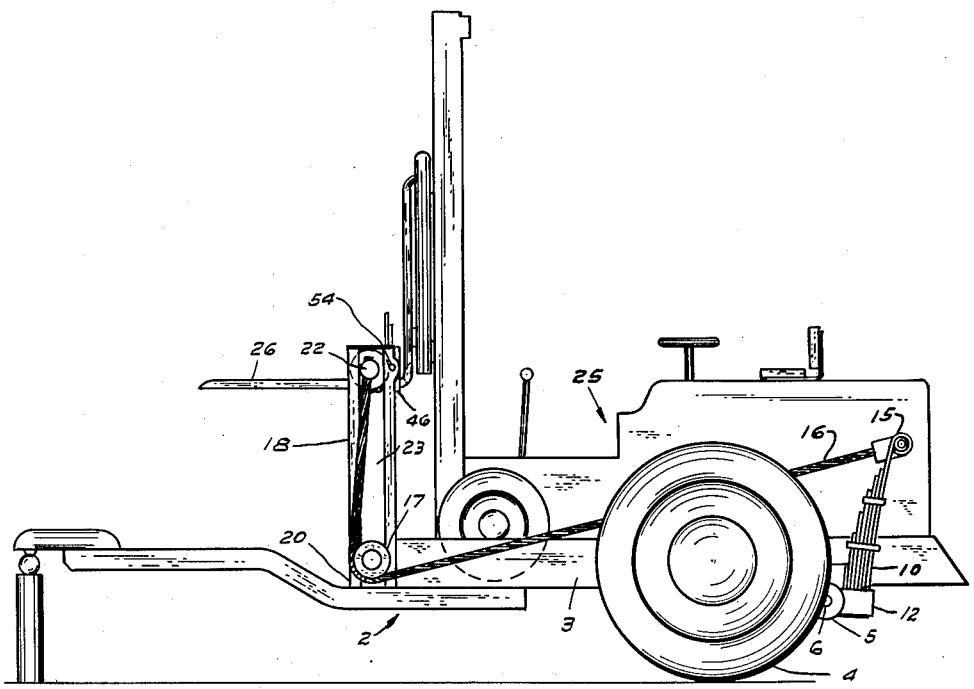

3,065,871
SELF ELEVATING FORK LIFT TRUCK TRAILER
Arthur G. Schramm, 215 N. 28th St., Phoenix, Ariz.
Filed Nov. 14, 1960, Ser. No. 68,985
5 Claims. (Cl. 214—506)

This invention concerns a self-elevating fork lift truck trailer.

One of the objects of this invention is to provide a trailer which will accept and carry a fork lift truck when in lowered position, and will then engage the lifting forks of the truck and raise its bed to running position by means of the operation of the forks of the fork lift truck.

Another object is to provide a trailer which may be towed by any suitable automotive vehicle and is provided with wheels arranged so that they may be raised and lowered relative to the bed of the trailer, said raising and lowering mechanism being attached to the wheels through spring mechanism so that when the wheels are lowered relative to the body and the body raised relative to the wheels they will carry the load of and on the trailer bed in a resilient manner in order to make the trailer road worthy.

Still another object is to provide a trailer having a bed and riding wheels pivotally attached thereto and connected by a cable and spring means so that they may be pivoted downward toward the earth while the bed of the trailer is raised upward; said pivoting movement being powered by the forks of a fork lift truck mounted on the bed of the trailer.

Other objects will appear hereinafter.

I attain the foregoing objects by means of the devices, parts and combinations of parts shown in the accompanying drawings, in which—

FIGURE 4 is a side elevational view of the trailer shown in FIGURE 1 with a fork lift truck mounted on the bed and with the wheels of the trailer shown in lowered position with the trailer bed raised;

FIGURE 5 is an alternative form of mechanism that may be used to raise the bed of the trailer by means of the forks of a fork lift truck, mounted on said trailer;

FIGURE 6 is a side elevational view of one of the bar latches, drawn on an enlarged scale; and FIGURE 7 is an end edge view thereof.

Similar numerals refer to similar parts in the several views.

Figure 2:
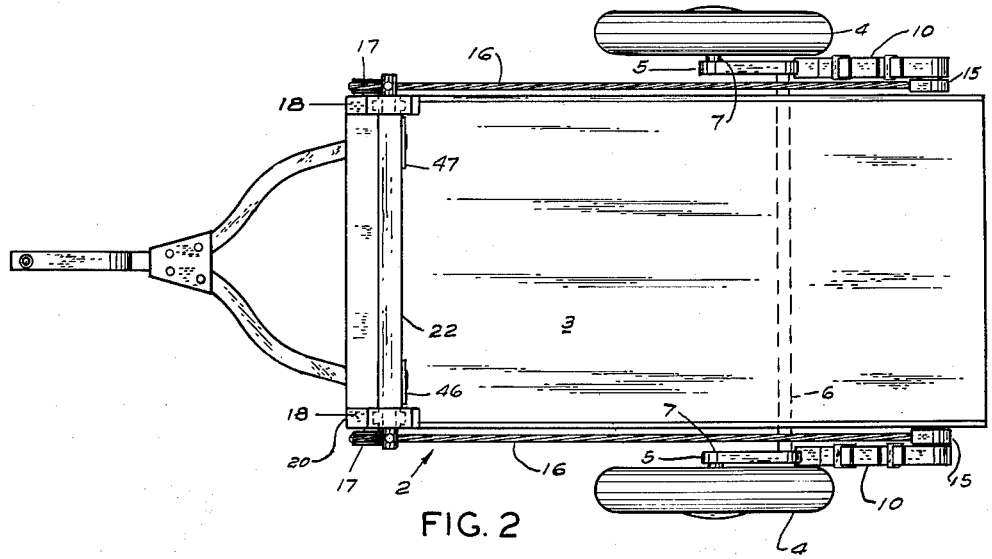
FIGURE 2 is a plan view thereof.

The trailer generally indicated by numeral 2 has a bed 3 which is supported on riding wheels 4 attached to each side of the bed by means of wheel arms 5. The wheel arms are pivotally attached to bed 3 by means of shaft 6 which is keyed to the inner ends of each arm.

Wheels 4 are supported on spindles 7 at the outer or free ends of the wheel arms 5.

On the shaft 6 there are spring attaching blocks 8 which have boxes 12 to compress and hold the thick or butt ends of springs 10.

The outer ends of springs 10 are provided with shackles 15 to which cables 16 are attached.

It is to be understood that where the plural is used, in describing the above parts, it indicates that there are right and left counter-parts of the several elements mentioned.

Cables 16 extend forward and are bent and run over pulleys 17 attached near the bottom ends of upright frame members 18. These frame members are, in turn, attached to the sides of the forward end of the trailer bed 3 at the positions indicated by numeral 20. Cables 16, after being drawn around pulleys 17, extend upward and are attached to each end, respectively, of a sliding crossbar 22 that is arranged to slide in slots 23 on each of the vertical members 18, respectively.

Figure 1:
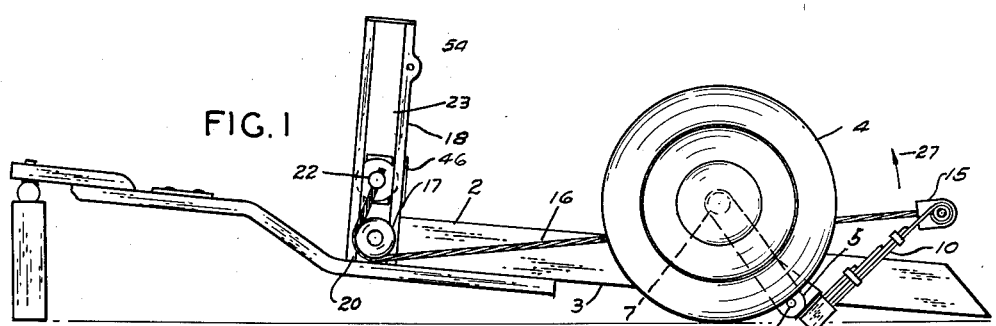
FIGURE 1 is a side elevational view of a trailer embodying my improved fork lift lifting means.
Figure 3:
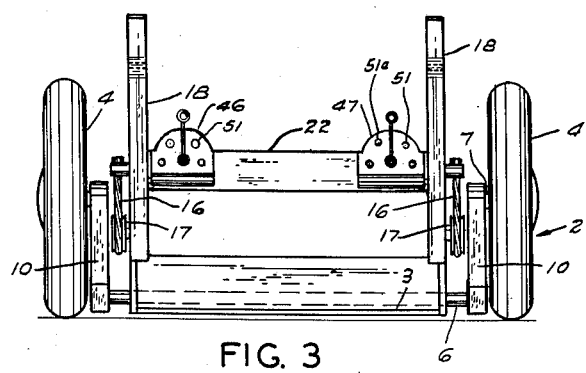
FIGURE 3 is a rear elevational view thereof.

When a fork lift truck, such as 25, is run onto the trailer bed 3, which can be done when the trailer bed is in the lowered position, as shown in FIGURE 1, the forks 26 at its front end can be inserted under crossbar 22. When the forks are lifted toward the position shown in FIGURE 4, the crossbar 22 will be drawn upward and this, in turn, will operate cables 16 so as to draw the outer ends of springs 10 forward and upward as indicated by arrow 27. This will, in turn, swing the wheel arms 5 downward. The wheel arms being forced downward will move wheels 4 downward and tend to raise transverse shaft 6. This will, in turn, raise the trailer bed 3 from the position shown in FIGURE 1 to the position shown in FIGURE 4. Note that in FIGURE 4 the cables 16 hold the springs 10 in a vertical position and the cables support the weight of the trailer through the springs.

With the trailer bed 3 raised, as shown in FIGURE 4, the trailer is ready to be towed in the usual manner. The fork lift truck may be used to lower the trailer bed and then be removed from the trailer bed by a reversal of the operations above stated.

In the form of the device shown in FIGURE 5 the forks 35 of the fork lift trailer engage a transversely positioned roller 36 on arms 37 which are pivotally attached at the upper ends of upright frame pieces 18 by stub shafts 38. These shafts (right and left) are attached to lever arms 40 which are angularly positioned relative to arms 37. This angle is approximately 90 degrees, as shown in FIGURE 5. The outer ends of arms 40 are connected to the cables 16 which in turn, connect to the outer ends of the springs 10, which operate on wheels 4 as previously explained. Upward motion applied to the roller 36 by the forks 35 will cause the arms 40 to move forward and upward on body 3 in an arcuate path, and this will pull cables 16 so as to lower the wheels and their supports, as previously explained, and will consequently raise the body 3 from the ground.

In order to position the transverse bars 22 and 36 in the raised position independently of the lift of the forks 26 and 36 I provide the latches 46 and 47 which operate between the ends of crossbar 22 and the right and left vertical frame members 18. Each of these latches is substantially the same, and include a latch bolt 48 on which a latching strain or urge may be placed by moving the handle 49 and upper part of the spring wire operating element 50 behind boss 51, as shown in FIGURE 6. Bolt 48, slidably operating in slideway 52, at the bottom of plate 53 will enter holes 54 when in register with these holes, which is disposed near the top of each upright member 18. Conversely bolts 48 will be withdrawn when binding is removed by the forks 26, and as a strain in the opposite direction is produced by moving handle 49 forward on boss 51a as shown in dotted lines FIGURE 6.

Similar latches 60 are applied to arms 40 and operate latch pins 61 to engage in a hole 62 in arcuate plate 63, as shown in FIGURE 5.

The latches release the strain of the weight of the trailer bed and tractor from the cables.

Equivalent stops may be effected by providing pivoted braces (not shown) on the sides of bed 3 which may be releasably attached to the free ends of springs 10.

Since ordinarily a fork lift truck, such as shown at 25, cannot lift its own weight by the forks, I attain mechanical advantage in the above described devices by making the length of the springs 10 greater, from the center of shaft 6 to the clevices 15 than the length of wheel arms 5. Power multiplying pulleys and sheaves may also be used in connection with cables 16.

I claim:

1. A self elevating fork lift truck trailer composed of a bed to support a fork lift truck, elevating type wheels supported by wheel arms on a transverse shaft attached under said bed, spring means extending crankwise from said wheel supporting means, a vertically movable crossbar mounted on said bed adapted and disposed to be engaged by the forks of a fork lift truck mounted on said trailer bed, and mechanical means operating between said crossbar and said spring and wheel operating and supporting means connected so that, when said crossbar is raised said wheels will be lowered and said bed will be raised.

2. A self elevating fork lift truck trailer composed of a bed to support a fork lift truck, riding wheels for said trailer operating on stub shafts supported on wheel arms attached to a transverse shaft extending under said bed, leaf springs having butt ends and free ends attached at their butt ends to said transverse shaft and having their free ends extending substantially radially relative to the axis of said shaft, upright frame members attached to each side of said body frame, a crossbar to engage the forks of a truck carried on said bed slidably supported in said uprights, sheaves on the bottom end portion of said uprights, and cables attached to the free ends of said springs, running over said sheaves and bending upward to and attached to the respective ends of said crossbar, and latching mechanism on said crossbar to hold it in elevated position independently of said forks.

3. An elevatable trailer, for transporting fork lift trucks, having a bed, riding wheels journalled on spindles on wheel arms, a transverse shaft journalled on said bed, pivotally supporting said wheel arms at its respective ends, flat springs attached at one end to said transverse shaft and extending radially from said transverse shaft, upright frame members having vertical slots attached to each side, respectively, of said bed, a crossbar disposed to be engaged by the forks of a fork lift truck carried on said bed and having its ends slidably operative in the slots in said upright frame members, laterally positioned sheaves on the bottom portion of each of said upright members, cables attached to the outer free ends of said springs, running over said sheaves and attached to the ends of said crossbar so that upward motion of said crossbar will swing said springs and rotate said transverse shaft and move said wheel arms downward to tend to lift said bed when said wheels are resting on the ground.

4. An elevatable trailer, for transporting fork lift trucks, having a bed, riding wheels journalled on spindles on wheel arms, a transverse shaft journalled on said bed, pivotally supporting said wheel arms at its ends, flat springs attached at one end to said transverse shaft and extending radially from said transverse shaft, upright frame members having vertical slots attached to each side of said bed, respectively, a crossbar disposed to be engaged by the forks of a fork lift truck carried on said bed and having its ends slidably operative in the slots in said upright frame members, laterally positioned sheaves on the bottom portion of said upright members, cables attached to the outer free ends of said springs, running over said sheaves and attached to the ends of said crossbar so that upward motion of said crossbar will move said springs and rotate said transverse shaft and move said wheel arms downward to tend to lift said bed when said wheels are resting on the ground, and latch mechanism operative on said crossbar to releasably hold it in raised position.

5. An elevatable trailer, for transporting fork lift trucks, having a bed, riding wheels journalled on spindles on wheel arms, a transverse shaft journalled beneath said bed, pivotally supporting said wheel arms at its ends, flat springs attached at one end to said transverse shaft and extending radially from said transverse shaft, upright frame members having vertical slots attached to each side of said bed, arms pivotally attached to the upper ends of said vertical frame members, a transverse roller crossbar disposed to be contacted by the forks of a fork lift truck carried on said bed, and attached at its ends to each of said pivotally attached arms, lever arms disposed on the pivotal ends of said pivotally attached arms at their upper ends and extending radially therefrom at an angle of approximately ninety degrees relative thereto, cables attached at one end to said respective lever arms and attached to said springs at the opposite ends; said parts being disposed so that when said transverse bar is raised by said truck forks the wheels on said wheel arms will be lowered, and latch mechanism on the outer end portions of said lever arms releasably securing said lever arms in a position to maintain said wheels in lowered position.

References Cited in the file of this patent

UNITED STATES PATENTS

| | | |
|---|---|---|
| 2,567,672 | Lawless | Sept. 11, 1951 |
| 2,577,246 | Hill | Dec. 4, 1951 |
| 2,905,481 | Schramm | Sept. 22, 1959 |